United States Patent [19]

Sindle

[11] 3,842,397

[45] Oct. 15, 1974

[54] ULTRASONIC DISTANCE DETECTION FOR VEHICLES

[76] Inventor: Thomas Sindle, 15 Roosevelt St., Staten Island, N.Y. 10304

[22] Filed: Aug. 27, 1973

[21] Appl. No.: 391,087

[52] U.S. Cl............. 340/1 R, 340/32, 343/112 CA
[51] Int. Cl................................................ G01s 9/68
[58] Field of Search ........ 340/1 R, 1 T, 3 R, 32–34; 343/112 CA

[56] References Cited
UNITED STATES PATENTS
2,801,403   7/1957   Kietz................................. 340/1 R Primary Examiner—Richard A. Farley
Attorney, Agent, or Firm—Allison C. Collard

[57] ABSTRACT

An ultrasonic distance detector for vehicles using a plurality of transducers located around the sides of the vehicle and connected to transmitters for sending sonic pulses to distant objects. Each of the transducers is connected to a receiver for detecting sonic echoes from close objects. The output of each receiver is connected to individual indicator lamps and a warning device such as a horn so that if any of the lamps are energized, the driver is warned that one side of the vehicle is in danger of a collision.

5 Claims, 10 Drawing Figures

PATENTED OCT 15 1974

PATENTED OCT 15 1974   3,842,397

ULTRASONIC DISTANCE DETECTION FOR VEHICLES

This invention relates to an ultrasonic measuring device particularly suitable for motor vehicles.

More specifically, this invention relates to an ultrasonic distance calculator and warning device particularly suitable for vehicles such as automobiles for detecting the proximity of the vehicle with respect to other objects.

In the ordinary uses of a vehicle such as a truck or cars there are certain "blind" spots surrounding the vehicle which cannot be easily observed by the motorist. These blind spots are usually located at the rear corners of the vehicle where the motorist finds certain obstructions in his way blocking full view of these rear corners. In another instance, when a motorist is pulling into or backing out of a parking space, it is difficult for the motorist to maintain his attention simultaneously on all sides of the vehicle in order to avoid hitting adjacent objects such as other cars.

In the prior patented art, there have been provided ultrasonic devices attached to the rear of vehicles such as trucks to measure the distance between the tailgate of the vehicle and a loading platform. Other vehicles have been provided with ultrasonic listening devices for providing a warning when the noise level of an adjacent moving object or vehicle reaches a certain threshold level.

Accordingly, the present invention provides a plurality of ultrasonic sending and receiving devices positioned in various locations around the outer surface of a vehicle such as an automobile for providing a warning to the driver when one of the vehicle surfaces closes to a pre-determined distance with respect to an external object. Each of the vehicle's ultrasonic detectors are coupled to an indicator and warning device mounted adjacent to the driver, and in the case of an automobile, mounted on the dashboard. The indicating device includes a plurality of lamps each connected to one of the ultrasonic distance detection devices so that the driver can be warned as to the exact location of any portion of the vehicle which might be in danger of a collision.

It is therefore an object according to the present invention to provide an ultrasonic distance measuring apparatus for sensing the proximity of different sides of a vehicle with respect to external objects.

It is another object according to the present invention to provide an ultrasonic distance sensing apparatus which provides the driver of a vehicle with an indication and a warning that a particular portion of the vehicle is in close proximity to external objects.

It is still another object according to the present invention to provide a proximity detection device which is simple in design, reliable in operation and inexpensive in cost.

Other objects and features of the present invention will become apparent from the following detailed description considered in connection with the accompanying drawings which disclose the embodiments of the invention. It is to be understood however that the drawings are designed for the purposes of illustration only and not as a definition of the limits of the invention.

In the drawings wherein similar reference characters denote similar elements throughout the several views.

Figure 1:
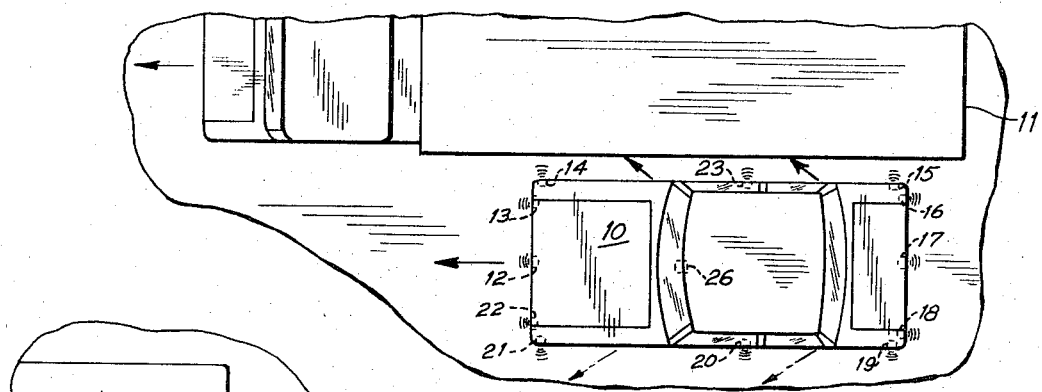
FIG. 1 is a top plan view showing the location of the ultrasonic detection devices on a vehicle according to the invention.

Referring to FIGS. 1-4 there is shown a vehicle 10 such as an automobile travelling adjacent to another vehicle 11 such as a truck. Vehicle 10 includes a plurality of ultrasonic sensing devices 12, 13, 14, 15, 16, 17, 18, 19, 20, 21, 22 and 23 positioned around the vehicle preferably along external vertical surfaces. Ultrasonic device 12 is preferably mounted on the front bumper or grille work of the vehicle whereas devices 13 and 22 are preferably mounted on the front fenders and pointing in the direction of travel of the vehicle. Devices 14, 15, 19 and 21 are preferably mounted on the sides of the fenders to detect objects which approach the vehicle transversely with respect to its direction of travel. Devices 16, 17 and 18 are directed toward the rear of the vehicle to sense the presence of objects approaching the back fenders or bumpers. In addition to the above, devices 20 and 23 are mounted on the doors of the vehicle in order to protect the doors from possible collision with external objects.

Figure 2:
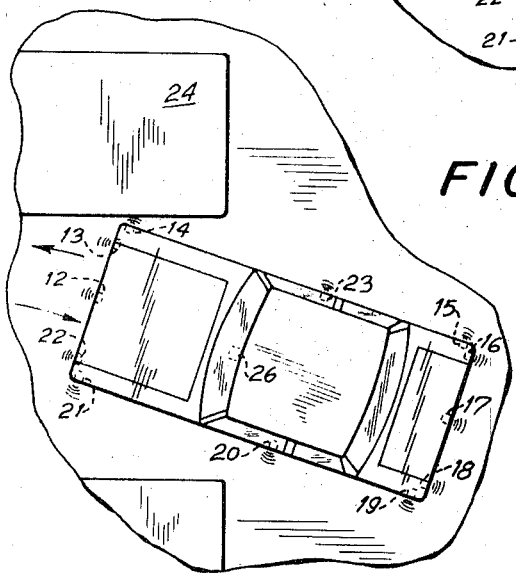
FIG. 2 is a top plan view showing the approach of the vehicle of FIG. 1 to an external object.

As shown in detail in FIG. 1, as vehicle 10 passes vehicle 11, ultrasonic detectors 14, 23 and 15 are capable of sensing the distance between the right side of the vehicle and the left side of the truck and provide a warning to the driver if the vehicle closes its distance with respect to the truck by a predetermined clearance. In FIG. 2, ultrasonic detector 14 protects the front right fender of the vehicle against external object 24 which may consist of another vehicle, parked in a parallel parking space. As vehicle 10 enters or leaves the adjacent parking space, the driver will receive a warning on indication panel 26 (FIG. 4) mounted on dashboard 25 if the fender becomes too close to object 24.

Figure 3:
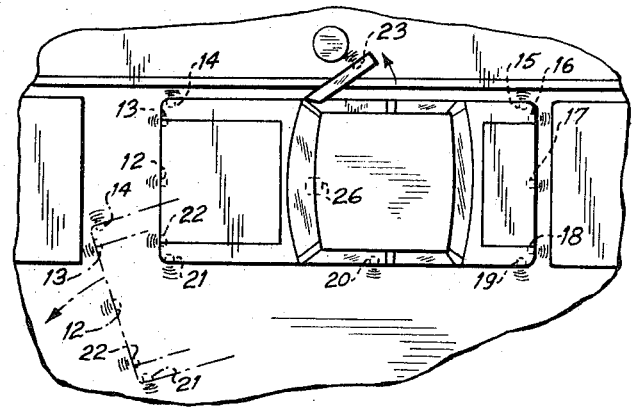
FIG. 3 is a top plan view showing other portions of the vehicle in proximity to foreign objects.
Figure 4:
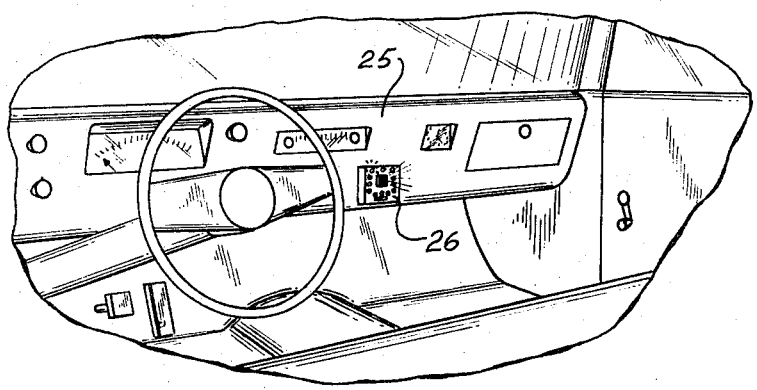
FIG. 4 is a perspective view of the dashboard of a vehicle showing an indicating and warning device according to the invention.

FIG. 3 is a detailed view of vehicle 10 parked in a space in front of and behind adjacent vehicles along a roadside. In leaving this parking space, ultrasonic detector 13 will protect the front right fender as the vehicle approaches the back of a forward object such as another vehicle. In a similar manner, ultrasonic detector 23 mounted on the right hand door of the vehicle will protect the door from damage by sidewalk objects such as telephone poles or fire hydrants when the door opens to within a predetermined distance with respect to these objects.

Figure 5:
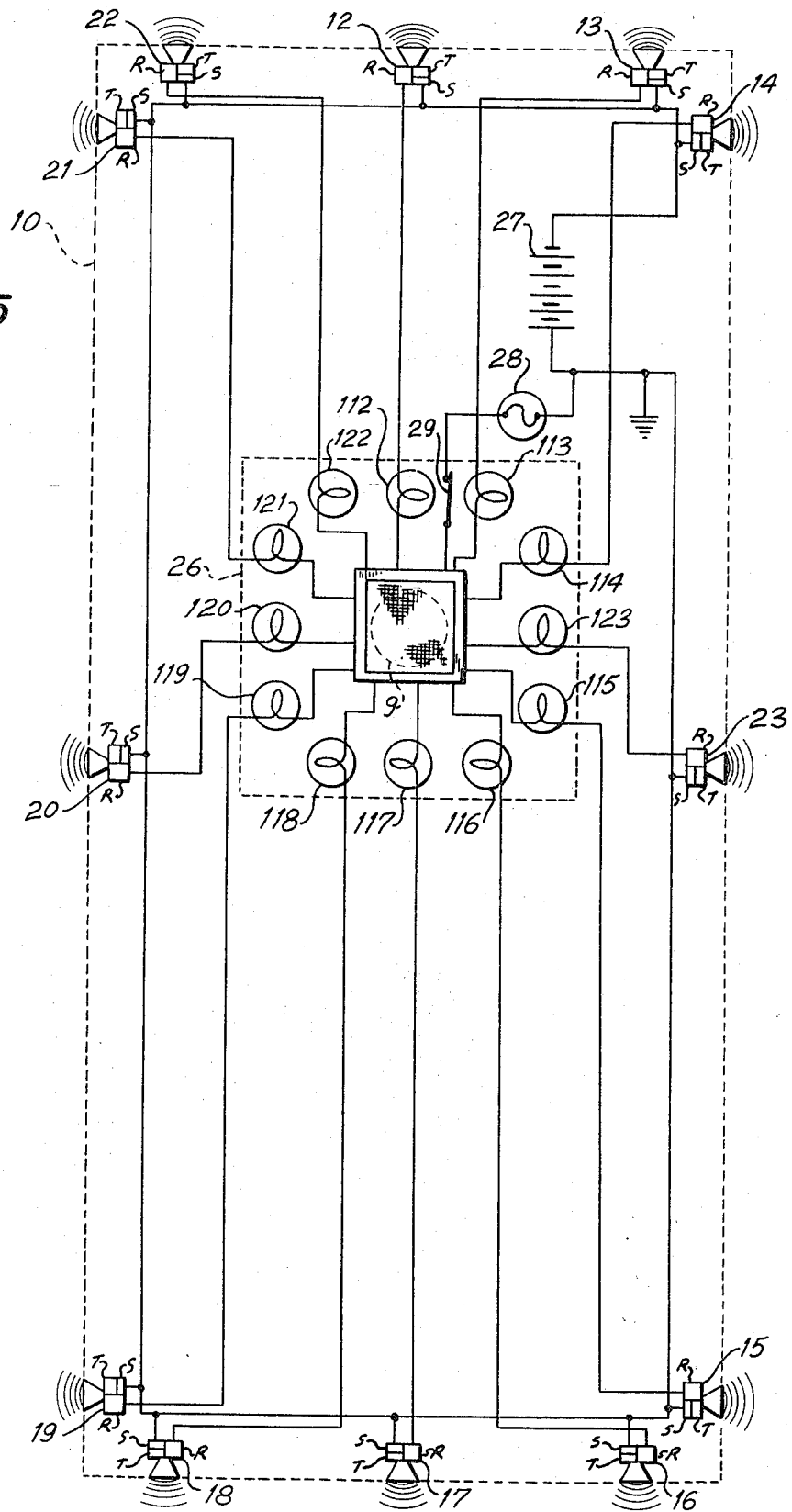
FIG. 5 is an electrical schematic diagram of the ultrasonic detection device according to the invention.

FIG. 5 is an electrical schematic diagram of the ultrasonic detection system according to the invention showing the location of detectors 12–23 and their individual electrical connection to indicator 26. Each of the detectors 12–23 include a transmitter T, a receiver R and a switch S for switching between the transmitter and receiver for controlling an individual ultrasonic transducer. The output of each receiver R of detectors 12–23 is connected to a respective indicator lamp 112–123 mounted within indicator 26 on the dashboard of the vehicle. Indicator 26 is connected to the battery 27 of the vehicle through fuse 28 and manual on-off switch 29. Each of the lamps can be further connected to a horn or buzzer 9 so that if one or more lamps is energized, the horn will alert the driver of a possible collision.

Figure 6:
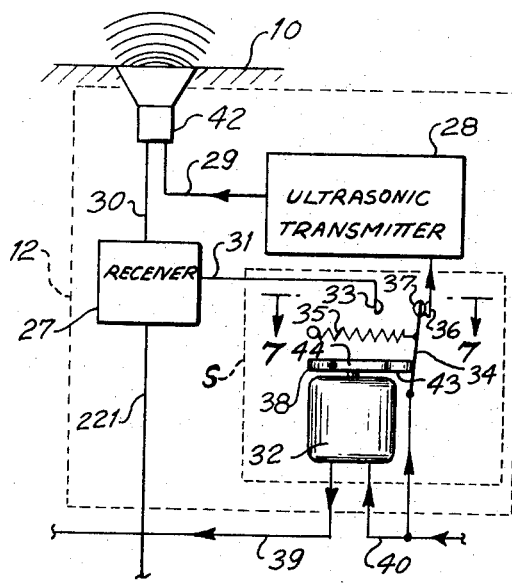
FIG. 6 is an electrical block diagram of one of the ultrasonic detectors in a transmitting mode.
Figure 8:
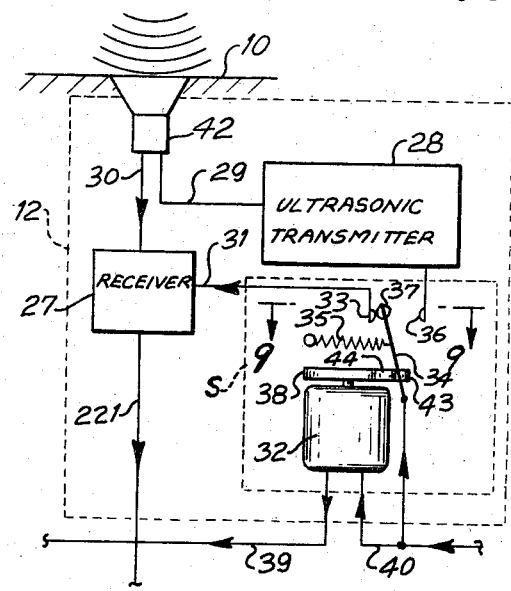
FIG. 8 is a block diagram of the ultrasonic detector of FIG. 6 in a receiving mode.
Figure 7:
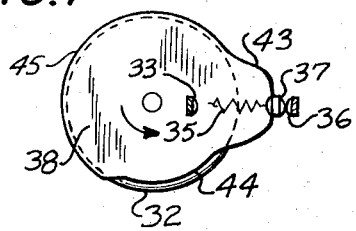
FIG. 7 is a detailed view of a motor driven switch of FIG. 6.
Figure 9:
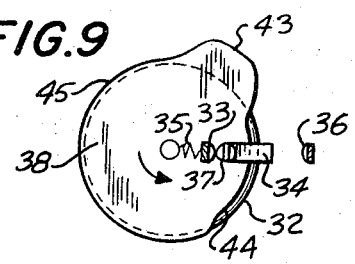
FIG. 9 is a detailed view of the rotary switch of FIG. 7 in another position.

FIG. 6 is a detailed view of ultrasonic detector 12 which is representative of any of the detectors 12–23 on the vehicle. In FIG. 6 an ultrasonic transducer 42 is mounted preferably flat on the surface of vehicle 10 and is connected by means of conductor 30 to receiver 27, and by means of conductor 29 to the output of transmitter 28. Transducer 42 is preferably constructed of barium titanate as is well known in the art and is designed to operate preferably in the ultrasonic range of 40–100 kilocycles per second. The output of receiver 27 is connected to line 221 which is connected at its opposite end to lamp 112 as discussed with respect to FIG. 5. The connector 12 includes a motor 32 connected to power lines 39 and 40. On the output shaft of motor 32 is a cam 38 having an elongated portion 43 for contact with a switch arm 34. At the end of arm 34 is a switch contact 37 designed for movement between spaced-apart contacts 33 and 36. A spring 35 connected to arm 34 is designed to urge contact 37 against contact 33. When cam 38 rotates to the position shown with respect to FIG. 8, projection 43 releases contact arm 34 so that spring 35 will return contact 37 to contact 33 as arm 34 touches surface 44.

In operation, when cam 38 is in the position as shown in FIG. 6, power from line 40 will be connected through contact arm 34 and through contacts 36 and 37 to transmitter 28 so that ultrasonic energy will be provided to transducer 42 to send out a signal from the side of the vehicle. When cam 38 rotates to portion 44 so that contact arm 34 moves contact 37 to engage contact 33, power from line 40 will energize receiver 27 so that return echoes from external objects can be received and detected.

Cam 38 mounted on the output shaft of motor 32 is designed to have several caming surfaces so as to initially turn the transmitter "on" and "off," and then turn the receiver "on" and "off" for a predetermined time period. Depending upon the frequency to be transmitted and the speed of motor 32, projection 43 on cam 38 can be designed to turn "on" transmitter 28 so that a few cycles of ultrasonic energy can be transmitted by transducer 42. After the transmitter is turned off, the receiver can be immediately turned "on" for a specified period of time in order to receive early return echoes for short distances such as 6–12 inches. For periods of time exceeding the desired return echo time, the receiver is silenced when contact arm 34 rides on cam portion 45 so that more distant echoes will not be displayed on indicator 26. Cam portion 45 silences receiver 27 by separating contacts 33 and 37, and the silent period can be sufficiently long so that by the time the next transmission occurs, distant echoes from the previous transmission have been severely attenuated and would not be detected by receiver 27. Likewise, the threshold level of receiver 27 can be raised so that only close echoes such as those returning from objects within 6–12 inches were detected.

If the transmitter frequency is selected to be approximately 45 kilocycles, the wave length of each transmitted pulse cycle will be approximately one-fourth of an inch. If it is desirable to transmit approximately 6–10 cycles, then the speed of cam 38 should be selected so that projection 43 actuates the transmitter for about 1/4,500 second. With the speed of sound approximately 1,100 feet per second, if it is desirable to sound a proximity warning for distances six inches or less from the vehicle, then receiver 27 should be turned on by cam portion 44 for a period of up to 1/1,100 of a second. The remaining cam portion 45 of increased diameter removes switch 34 and contact 37 away from contact 33 to shut off the receiver so that no echo sounds will be received beyond six inches.

Cam 38 may be enlarged so as to perform the switching function for all detectors 12–23 so that only a single motor 32 and cam 38 would be required. In that case, a plurality of switches and contact arms would be equally spaced around the cam and operate consecutively as the cam rotates.

Figure 10:
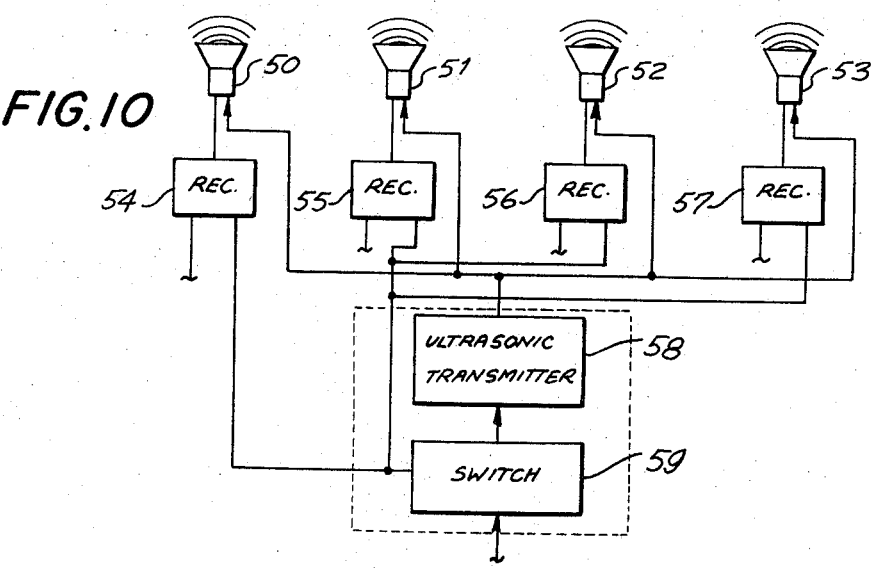
FIG. 10 is an electrical block diagram of another embodiment of the invention using a simpler electrical circuit.

In FIG. 10, a simplified version of the system is shown having preferably four transducers 50–53 connected to a common transmitter 58 and including individual receivers 54–57. A switch 59 connected to transmitter 58 and receivers 54–57 can selectively operate the transmitter and receivers in a manner similar to the embodiments of FIGS. 1–9. The output of each receiver can then be connected to indicator lamps similar to those shown in FIG. 5. With only four ultrasonic detectors, the detectors would be preferably located at the four corners of the vehicle.

It is conceivable that the switching for each of the detectors can also be done electronically by solid state circuitry. In this case, transmitter 28 would be designed to turn on and off several times per second to send out bursts of 6–10 cycles and operate receiver 27 between each burst for a predetermined time interval. The time interval could be adjustable or fixed so that a predetermined echo return time could be measured to be equivalent to 6 inches in distance.

The device of the present invention is designed for use on all types of moving vehicles such as trucks, cars, boats and the like. The minimum detectable distance for producing an indication can be adjusted to fit the particular needs of the vehicle for which the system is installed. For example, if the system were to be installed in a boat, the detectable distance would be increased to several feet whereas in an automobile, it may be desirable to be able to detect objects as close as 6 inches. Indicator panel 26 could also be designed in the shape of the vehicle to which it is installed so that the indication lamps could be located in the same position on the panel as the transducers are located on the vehicle.

While only a few embodiments of the present invention have been shown and disclosed, it is obvious that many changes and modifications may be made thereunto without departing from the spirit and scope of the invention.

What is claimed is:

1. An ultrasonic distance determining device for use on vehicles and the like comprising:
 a plurality of ultrasonic transducers each located along the sides of the vehicle;
 transmitter means having its input coupled to each of said transducers, said transmitter means comprising an individual transmitter coupled to the input of said transducers; receiver means coupled to each of said transducers, said receiver means comprising an individual receiver coupled to the output of each of said transducers;
 switch means coupled to the input of said transmitter means and said receiver means so as to selectively operate said transmitter means for each of said transducers and then operate said receiver means for a predetermined time interval; and
 indication means comprising a plurality of indicating lamps wherein each of said lamps are connected to the output of each of said receivers for providing an indication of the proximity of external objects located a predetermined distance from the vehicle corresponding to the predetermined time interval of the receiver for each of said transducers.

2. The ultrasonic distance determining device as recited in claim 1 wherein said switch means comprises at least one motor, cam means connected to the output shaft of said motor, and electrical contact means coupled to said cam and responsive thereto for alternately switching between said transmitter means and said receiver means.

3. The ultrasonic distance determining device as recited in claim 2 wherein said electrical contact means comprises a double-pole single throw switch having its first pole connected to said transmitter and a second pole connected to said receiver and including a movable switch contact arm for movement between said first and second pole, and wherein said cam means comprises a caming surface having a first portion having a projection for urging said movable switch contact arm into engagement with said first pole so as to operate said transmitter means, a second portion including a recess so as to permit said movable contact arm to connect to said second pole to disconnect said transmitter means and operate said receiver means and a third caming portion for disconnecting said receiver.

4. The ultrasonic distance determining device as recited in claim 1 wherein said transmitter means comprises a single transmitter having its output coupled to each of said transducers and said receiver means comprises a plurality of receivers, each of which is coupled to the output of said transducers, and wherein said switch means comprises a single switch having its output coupled to said transmitter and to each of said receivers so as to alternately operate the transmitter and said receivers.

5. The ultrasonic distance determining device as recited in claim 1 wherein said indication means further comprises a horn coupled to said lamps so that said horn will be energized when one or more lamps are energized.

* * * * *